United States Patent
Kato et al.

(10) Patent No.: US 9,490,613 B2
(45) Date of Patent: Nov. 8, 2016

(54) WIRE HARNESS

(75) Inventors: Takashi Kato, Makinohara (JP); Eiichi Toyama, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 7 days.

(21) Appl. No.: 13/817,161

(22) PCT Filed: Jul. 28, 2011

(86) PCT No.: PCT/JP2011/067342
§ 371 (c)(1),
(2), (4) Date: Feb. 15, 2013

(87) PCT Pub. No.: WO2012/026282
PCT Pub. Date: Mar. 1, 2012

(65) Prior Publication Data
US 2013/0140054 A1    Jun. 6, 2013

(30) Foreign Application Priority Data
Aug. 24, 2010    (JP) .................. 2010-186802

(51) Int. Cl.
*H02G 1/00* (2006.01)
*B60R 16/02* (2006.01)

(52) U.S. Cl.
CPC .......... *H02G 1/00* (2013.01); *B60R 16/0215* (2013.01)

(58) Field of Classification Search
USPC .................................... 174/68.3
See application file for complete search history.

(56) References Cited

U.S. PATENT DOCUMENTS

| | | | |
|---|---|---|---|
| 3,331,917 A * | 7/1967 | O'Keefe et al. ............ 174/75 C |
| 4,296,157 A * | 10/1981 | Conti ...................... H02G 1/08 138/121 |
| 4,560,828 A * | 12/1985 | Franckx et al. ............ 174/71 R |
| 6,376,777 B1 * | 4/2002 | Ito ........................ H02G 3/0468 16/2.1 |
| 7,172,042 B2 | 2/2007 | Yamaguchi et al. |
| 2001/0004022 A1 * | 6/2001 | Kobayashi .......... B60R 16/0207 174/72 A |
| 2001/0020539 A1 * | 9/2001 | Adachi .............. B60R 16/0215 174/72 A |

(Continued)

FOREIGN PATENT DOCUMENTS

| | | |
|---|---|---|
| CN | 101740880 A | 6/2010 |
| EP | 0943852 A1 | 9/1999 |

(Continued)

OTHER PUBLICATIONS

International Search Report (PCT/ISA/210) dated Sep. 13, 2011, issued by the International Searching Authority in International Application No. PCT/JP2011/067342.

(Continued)

*Primary Examiner* — William H Mayo, III
*Assistant Examiner* — Krystal Robinson
(74) *Attorney, Agent, or Firm* — Sughrue Mion, PLLC

(57) ABSTRACT

A wire harness includes a high-voltage wire and a pipe member for receiving the high-voltage wire. The pipe member is provided, at a plurality of points thereon, with crushed portions formed by crushing a pipe outer surface inward. The crushed portions are formed as portions to which clamps are to be attached. The crushed portions are formed and positioned in correspondence with positions of L-shaped brackets. The crushed portions are formed as portions for generating protrusions on a pipe inner surface, and the protrusions serve as a contact supporting point for the high-voltage wire.

8 Claims, 2 Drawing Sheets

(56) References Cited

U.S. PATENT DOCUMENTS

| | | |
|---|---|---|
| 2005/0011687 A1 | 1/2005 | Yamaguchi et al. |
| 2009/0167078 A1 | 7/2009 | Watanabe |
| 2010/0043225 A1 | 2/2010 | Oga et al. |
| 2010/0120302 A1 | 5/2010 | Kumakura |

FOREIGN PATENT DOCUMENTS

| | | | |
|---|---|---|---|
| EP | 1440834 A1 | | 7/2004 |
| GB | 672567 A | | 5/1952 |
| JP | 2004-236447 A | | 8/2004 |
| JP | 2006-182087 A | | 7/2006 |
| JP | 2006-312409 A | | 11/2006 |
| JP | 2006312409 A | * | 11/2006 |
| JP | 2009-166635 A | | 7/2009 |
| JP | 2010-173429 A | | 8/2010 |
| JP | 2010-176886 A | | 8/2010 |
| WO | 2006/057138 A1 | | 6/2006 |
| WO | 2007/032391 A1 | | 3/2007 |

OTHER PUBLICATIONS

International Preliminary Report on Patentability dated Mar. 19, 2013, issued by the International Searching Authority in counterpart International Application No. PCT/JP2011/067342.

Written Opinion dated Sep. 13, 2011, issued by the International Searching Authority in counterpart International Application No. PCT/JP2011/067342.

Communication from the Japanese Patent Office dated Oct. 7, 2014, in a counterpart Japanese application No. 2010-186802.

Communication from the State Intellectual Property Office of P.R. China dated Mar. 9, 2015 in a counterpart application No. 201180040906.0.

Search Report dated Nov. 5, 2015, issued by the European Patent Office in counterpart European Application No. 11819747.4.

Office Action dated Aug. 20, 2014 issued by the State Intellectual Property Office of the People's Republic of China in counterpart Chinese Patent Application No. 201180040906.0.

* cited by examiner

WIRE HARNESS

TECHNICAL FIELD

The present invention relates to a wire harness including a pipe member for receiving a conducting path.

BACKGROUND ART

A wire harness disclosed in Patent Literature 1 as described below includes three high-voltage wires and three metal protective pipes for respectively receiving each of three high-voltage wires. The high-voltage wires electrically connect an inverter mounted in a front section of a vehicle with a battery mounted in a middle or rear section of the vehicle.

The wire harness is arranged through beneath a body floor which becomes the outside of a panel member (body frame). This wire harness arranged beneath the floor is configured such that the metal protective pipes can protect the high-voltage wires from being splattered with stones or water. The metal protective pipes are made of a metal material and thus have rigidity.

CITATION LIST

Patent Literature

Patent Literature 1: JP-A-2006-312409

SUMMARY OF INVENTION

Technical Problem

Wire harnesses including such a metal protective pipe have the following problems.

A first problem is a problem caused when the metal protective pipe is fixed to the panel member by clamps (fixing member). Specifically, when the clamps include an annular pipe attaching portion and an engaging portion integrally formed with the annular pipe attaching portion, the annular pipe attaching portion of the clamps needs to be previously attached on the metal protective pipe. Also, when a misalignment between positions of the clamps and fixing positions of the metal protective pipe is caused just before the metal protective pipe is fixed, the annular pipe attaching portion needs to be slidingly moved to align with the fixing positions. Thus, the greater the position misalignment, the greater an amount of such sliding movement becomes. Also, if the position misalignment is not eliminated, the clamps cannot be engaged and fixed to the panel member by the engaging portion. As a result, the wire harness according to the related art has a problem in that an operation for fixing the metal protective pipe becomes troublesome.

Also, a second problem is a problem caused when the clamps are used as described above. Specifically, because the annular pipe attaching portion and the engaging portion have respectively a thickness and a protruding height, the metal protective pipe is placed close to a ground surface by dimensions of the annular pipe attaching portion and the engaging portion. Thus, the metal protective pipe can be arranged to be likely to be affected by a spattering of stones, a curbstone block or the like.

Furthermore, a third problem is a problem caused when the number or type of the high-voltage wires is plural. Specifically, if the metal protective pipes are newly prepared in correspondence with the number or types of the high-voltage wires in a one-to-one manner, component management could be troublesome. As a solution to this problem, it can be considered that types of the metal protective pipes need to be standardized to a certain degree. However, when types of the metal protective pipes are standardized, there is a case in which an occupancy ratio of the high-voltage wires inside the metal protective pipes can be lowered. As a result, the high-voltage wires are rattled due to vibrations upon driving, thereby causing a damage of wire sheaths and the like.

To easily perform an operation when the high-voltage wire is inserted through the metal protective pipe, the metal protective pipe is commonly configured to have an inner diameter greater than an outer diameter of the wire, so that a clearance in dimension can be formed. However, if the clearance is too much, the rattling as described above can be caused.

Furthermore, a fourth problem is a problem caused when the occupancy ratio of the high-voltage wire inside the metal protective pipe is lowered. Specifically, when the occupancy ratio is lowered, contact points with a pipe inner surface can be decreased, and also a distance spaced from the pipe inner surface on regions in which the high-voltage wire is not contacted with the pipe inner surface can be increased, so that a heat generated on the high-voltage wire cannot be efficiently transferred to the metal protective pipe. As a result, it is difficult to increase the heat radiation effect.

Meanwhile, it is believed that the grade of the high-voltage wire can be lowered if the heat radiation effect is enhanced, thereby contributing to cost reduction.

Accordingly, the present invention has been made keeping in mind the above problems, and a problem defined in the present invention is to provide a wire harness which can improve workability, can be reduced in thickness to increase the distance spaced from a ground surface, can be prevented from rattling in a pipe while inhibiting an increase of types of pipes, and enhance heat radiation effect.

Solution to Problem

The problem defined in the present invention is solved by the following configurations.

(1) A wire harness, including: a conducting path; a pipe member which receives the conducting path; and crushed portions provided at a plurality of points on the pipe member, wherein the crushed portions are formed by crushing an outer surface of the pipe member inward.

(2) The wire harness according to the configuration of (1), wherein the crushed portions are provided in correspondence with fixing positions of the pipe member with respect to a fixed member to which the pipe member is fixed.

(3) The wire harness according to the configuration of (1) or (2), wherein the crushed portions are formed by crushing in one direction or both directions including one direction and the other direction along a fixing direction of the pipe member.

With the wire harness according to the configuration of (1), the crushed portions are provided at a plurality of points on the pipe member, and thus protrusions, which serve as contact supporting points for the conducting path, can be generated on a pipe inner surface. As a result, rattling of the conducting path can be prevented while inhibiting an increase of types of pipes. Also, when rattling of the conducting path is prevented, a damage of the conducting path and the like can in turn be prevented. Furthermore, when the protrusions are generated, contact points with the conducting path can be increased, and also a gap between the conducting path and the pipe inner surface can be narrowed. Thus, the heat radiation effect can be enhanced. When the heat radiation effect is enhanced, the grade of the conducting path can be lowered, thereby contributing to cost reduction.

With the wire harness according to the configuration of (2), the crushed portions are provided in correspondence with fixing positions of the pipe member with respect to a fixed member to which the pipe member is fixed, and thus positioning of fixing members such as clamps can be easy. As a result, enhancement of workability with respect to fixation of the pipe member can be achieved. Also, when the pipe member is fixed on a floor-beneath portion of a panel member (body frame) of a vehicle, a distance spaced from the ground surface can be increased by a recessed amount of the crushed portion, even if fixing members such as clamps are used. Thus, a thickness with respect to arrangement of the wire harness can be reduced.

With the wire harness according to the configuration of (3), a more suitable forming method can be provided in forming the crushed portion. The crushed portions formed by crushing in both directions including one direction and the other direction along a fixing direction of the pipe member can be formed to have a crushed amount thereof set equal in both directions, and also formed to have a crushed amount in one direction set smaller to be asymmetric with that in the other direction. In addition, the crushed portions formed by crushing in one direction can allow the conducting path to be biased and contacted to a pipe inner surface on the other direction side.

BRIEF DESCRIPTION OF DRAWINGS

FIGS. 1(a) to 1(c) are diagrams showing a wire harness according an embodiment of the present invention, wherein FIG. 1(a) is a schematic view of a vehicle, FIG. 1(b) is a sectional view showing a main part including a crushed portion, and FIG. 1(c) is an explanatory view showing formation of the crushed portion (First Embodiment).

FIGS. 2(a) to 2(c) are diagram showing a wire harness according another embodiment of the invention, wherein FIG. 2(a) is a schematic view of a vehicle, FIG. 2(b) is a sectional view showing a main part including a crushed portion, and FIG. 2(c) is an explanatory view showing formation of the crushed portion (Second Embodiment).

DESCRIPTION OF EMBODIMENTS

A wire harness according to embodiments of the present invention includes a conducting path, such as a high-voltage wire, and a pipe member for receiving the conducting path. The pipe member is provided, at a plurality of points thereon, with crushed portions formed by crushing an outer surface thereof inward.

First Embodiment

A first embodiment of the present invention will be now described with reference to the accompanying drawings.

A wire harness according to this embodiment is intended to be arranged in a hybrid vehicle or an electric vehicle. The wire harness includes a shield member according to the present invention. Hereinafter, a case with respect to hybrid vehicles will be described as an example (configurations, structures and effects of the wire harness of the present invention are also essentially identical for electric vehicles; and also, the invention is not limited to hybrid vehicles or electric vehicles, but can be applied to conventional vehicles and the like).

Figure 1:
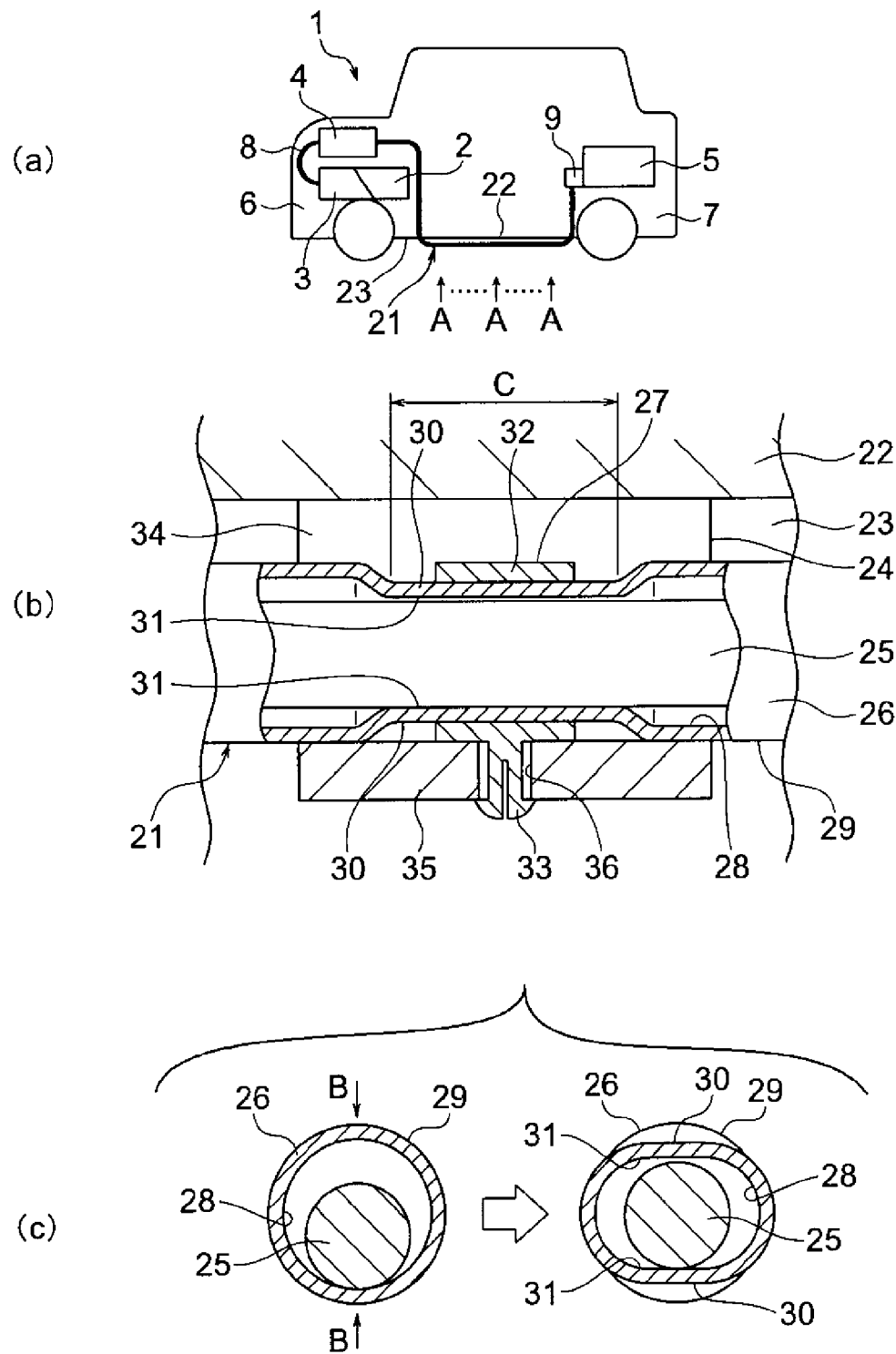

In FIG. 1, a reference numeral 1 designates a hybrid vehicle. The hybrid vehicle 1 is a vehicle driven by a combination of a power of an engine 2 and a power of a motor unit 3, and the motor unit 3 is supplied with an electric power from a battery 5 (cell package) via an inverter unit 4. According to the embodiment, the engine 2, the motor unit 3 and the inverter unit 4 are mounted in an engine room 6 at a location in which front wheels are disposed. The battery 5 is mounted in a vehicle rear section 7 at a location in which rear wheels and the like are disposed (the battery may be mounted in the cabin of the vehicle located behind the engine room 6).

The motor unit 3 and the inverter unit 4 are connected to each other by a known high-voltage wire harness 8. Also, the battery 5 and the inverter unit 4 are connected to each other by a wire harness according to the first embodiment. The wire harness 21 is for a high voltage and is arranged on a floor-beneath portion 23, which is a side of a panel member 22 facing a ground surface. L-shaped brackets 24 which correspond to fixed members, to which the wire harness 21 is fixed, are provided at a plurality of points on the floor-beneath portion 23 of the panel member 22 (for example, the L-shaped brackets 24 are provided at locations shown by arrows A). The wire harness 21 and the battery 5 are connected to each other via a junction block 9 provided on the battery 5.

Here, proceeding to a supplementary description of this embodiment, the motor unit 3 is constituted of a motor and a generator. Also, the inverter unit 4 is constituted of an inverter and a converter. The motor unit 3 is formed as a motor assembly including a shield casing. The inverter unit 4 is also formed as an inverter assembly including a shield casing. The battery 5 is a Ni-MH or Li-ion based battery and is modularized. Also, an electric accumulating device, such as a capacitor, may be also employed. The kind of the battery 5 is not particularly limited if the battery 5 can be used in the hybrid vehicle 1 or an electric vehicle.

The wire harness 21 of the first embodiment includes two high-voltage wires 25 (conducting path) and two pipe members 26 for respectively receiving each of two high-voltage wires 25 (only one of two is shown). Also, the wire harness 21 includes a connector (not shown) provided on each of both ends of the high-voltage wire 25 and the pipe member 26. The wire harness 21 is fixed to the L-shaped brackets 24 using clamps 27 as fixing members. Hereinafter, each component of the wire harness 21 will be described.

The high-voltage wire 25 may be any of a known shielded wire which includes an electric wire with a shield member, a known non-shielded wire which includes only an electric wire without a shield member, and a high-voltage wire which has a shield function by providing an electromagnetic shield member (e.g., a cylindrical shield member formed by braiding or of a metal foil) outside of a non-shielded wire. According to the first embodiment, the high-voltage wire which has an electromagnetic shield function by providing an electromagnetic shield member outside of a non-shielded wire is used as the high-voltage wire 25 (this is only an example).

The high-voltage wire 25 is a conducting path including a conductor and an insulator (sheath) and is formed to have a length required for an electrical connection. The conductor is made of copper, copper alloy, or aluminum. The conductor may have any of a structure in which the conductor is constituted of twisted element wires, and a structure in which the conductor has a rod shape having a rectangular or round section (for example, a structure in which the conductor is constituted of a straight angle single core or a round single core; in this case the wire itself also has a rod shape).

Although the high-voltage wire 25 is used as the conducing path according to the first embodiment, the invention is not limited in this regard. Namely, a bur bar may be used, and in the case of conventional vehicles and the like, a bundle of low-voltage wires may be used.

The pipe member 26 is formed to have a length required for receiving the high-voltage wire 25. According to the first embodiment, the pipe member 26 is a cylindrical member having a circular section and is bended to be conformed to an arranging route (the sectional shape is only an example; the sectional shape may be an ellipse shape, an oblong shape, or a rectangular shape). According to the first embodiment, the pipe member 26 is formed of a cylindrical material made of aluminum. The material is also only an example. Namely, because the wire-voltage wire 25 in the first embodiment has an electromagnetic shield function, the pipe member 26 is not limited to being made of aluminum, but may be made of any metals or resins.

Because the conducting path has a plurality of types as seen from the foregoing description with respect to the high-voltage wire 25, types of the pipe member 26 are standardized to a certain degree. Namely, the pipe member 26 can have a generality, so that component management cannot be troublesome.

According to the first embodiment, as shown on a left side of FIG. 1(c), the high-voltage wire 25 is received in the pipe member 26 and a lower side thereof is contacted with a pipe inner surface 28 of the pipe member 26. In this time, the high-voltage wire 25 has a slightly a lower occupancy ratio as if a space is left above the high-voltage wire 25, or in other words, is disposed to be easily rattled (this is only an example).

The pipe member 26 is provided, at a plurality of points thereon, with crushed portions 30 formed by crushing a pipe outer surface 29 inward. The crushed portion 30 is formed as a portion on which the clamp 27 is to be attached. The crushed portion 30 is formed and positioned in correspondence with a position of the L-shaped bracket 24. Also, the crushed portion 30 is formed as a portion generating a protrusion 31 on the pipe inner surface 28, and the protrusion 31 serves as a contact supporting point for the high-voltage wire 25, When the pipe member 26 is made of a metal, the crushed portion 30 is formed by crushing by pressing. On the other hand, when the pipe member 26 is made of a resin, the crushed portion 30 is formed by crushing with heating.

The crushed portion 30 of the first embodiment is formed by crushing in directions of arrows B (corresponding to upward and downward directions perpendicular to the ground surface and also a fixing direction) in the figure in consideration of attachability of the clamp 27 and the like (see a right side of FIG. 1(c); the crushing direction is only an example). A crushed amount of the crushed portion 30 is set in consideration of a thickness of an annular pipe attaching portion 32 of the clamp 27 as described below. Also, to prevent rattling of the high-voltage wire 25, the crushed amount is set to leave a space as small as possible.

The crushed portion 30 is formed to serve as a portion for positioning the clamp 27. Also, the crushed portion 30 is formed to absorb a position misalignment by a slight sliding movement of the clamp 27, when the clamp 27 and the L-shaped bracket 24 are engaged and fixed to each other (the crushed portion 30 is formed to have a range C providing a clearance relative to a width of the annular pipe attaching portion 32 of the clamp 27 as described below).

The crush portion 30 may not be formed in pairs on upper and lower sides as in the first embodiment. Namely, the crush portion 30 may be, for example, formed only on the upper or lower side in the drawings (see a second embodiment as described below).

The clamp 27 includes the annular pipe attaching portion 32 and an engaging portion 33 integrally formed with the annular pipe attaching portion 32. The engaging portion 33 is formed in a shape in which the engaging portion 33 is caught on the L-shaped bracket 24 to be engaged therewith.

The L-shaped bracket 24 has an L-shaped section and includes a supporting portion 34 coupled perpendicular to the panel member 22 and a fixing portion 35 coupled perpendicularly to an end of the supporting portion 34. The fixing portion 35 is provided with an engaging hole 36 in which the engaging portion 33 of the clamp 27 is inserted and engaged. The panel member 22 and the fixing portion 35 define a space allowing the wire harness 21 to be arranged therebetween.

Also, the fixing by engaging between the clamp 27 and the L-shaped bracket 24 is only an example. The fixation of the wire harness 21 can be realized using a variety of other means and is not limited to the first embodiment (an example of other fixing means will be mentioned in a second embodiment described below).

As described above, according to the first embodiment, the crushed portions 30 are provided at a plurality of points on the pipe member 26, and thus the protrusions, which serve as contact supporting points for the high-voltage wire 25, can be generated on the pipe inner surface 28. As a result, rattling of the high-voltage wire 25 can be prevented. When rattling of the high-voltage wire 25 is prevented, a damage of the high-voltage wire 25 and the like can in turn be prevented.

Also, according to the first embodiment, when the protrusions 31 are generated, contact points with the high-voltage wire 25 can be increased. Also, a gap between the high-voltage wire 25 and the pipe inner surface 28 can be narrowed. Thus, the heat radiation effect can be enhanced. When the heat radiation effect is enhanced, the grade of the high-voltage wire 25 can be lowered (i.e., the grade in terms of heat resistance and the like can be lowered), thereby contributing to cost reduction.

Furthermore, according to the first embodiment, the crushed portions 30 are provided at a plurality of points on the pipe member 26 in correspondence with fixing positions, and thus positioning of the clamps 27 can be easy. As a result, enhancement of workability with respect to arrangement of the wire harness 21 (fixation of the pipe member 26) can be achieved.

Furthermore, according to the first embodiment, when the crushed portions 30 are provided at a plurality of points on the pipe member 26, the annular pipe attaching portions 32 of the clamps 27 can be received in the crushed portions 30. Correspondingly, a distance spaced from the ground surface can be increased. Thus, a thickness with respect to arrangement of the wire harness 21 can be reduced.

Second Embodiment

Figure 2:
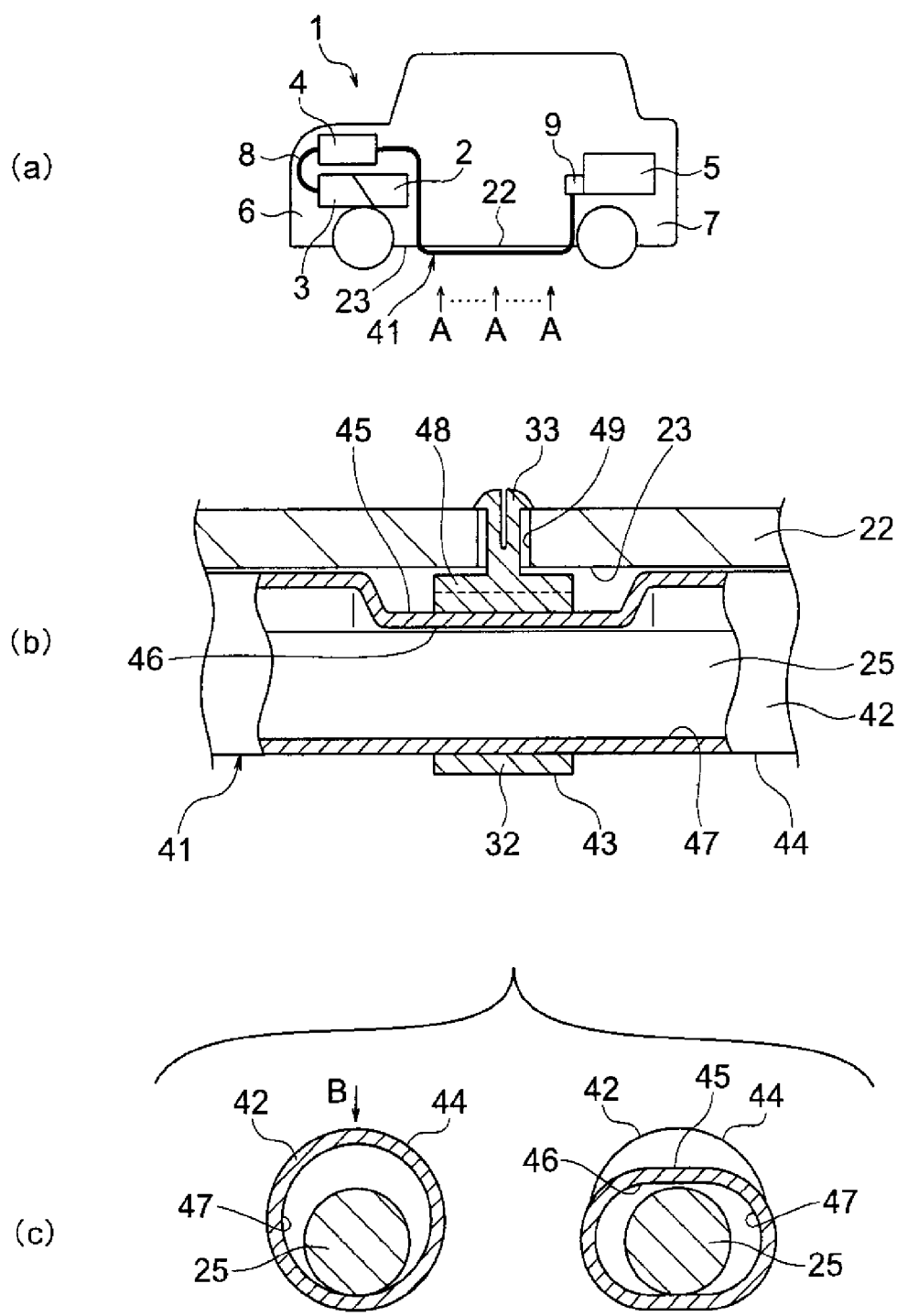

Hereinafter, a second embodiment will be described with reference to the accompanying drawings. FIGS. 2(a) to 2(c) are diagrams showing a wire harness according another embodiment of the invention, wherein FIG. 2(a) is a schematic view of a vehicle, FIG. 2(b) is a sectional view showing a main part including a crushed portion, and FIG. 2(c) is an explanatory view showing formation of the crushed portion. Also, members essentially identical to those of the first embodiment are designated by identical reference numerals and the detailed description thereof will be omitted.

A wire harness 41 according to this second embodiment includes a high-voltage wire 25 (conducting path), a pipe member 42 for receiving the high-voltage wire 25, and a connector not shown. The wire harness 41 is directly fixed to a floor-beneath portion 23 of a panel member 22 using clamps 43 as fixing members. The clamps 43 are provided at locations, for example, shown by arrows A, which correspond to fixed positions at which the wire harness 41 is fixed.

The pipe member 42 has the same structure, function, material and the like as those of the pipe member 26 of the first embodiment. The pipe member 42 is provided, at a plurality of points thereon, with crushed portions 45 formed by crushing a pipe outer surface 44 inward. The crushed portions 45 are formed and positioned in correspondence with the fixed positions. The crushed portions 45 are formed to have the same structure and function as those of the crushed portions 30 of the first embodiment. A reference numeral 46 designates a protrusion generated on a pipe inner surface 47.

The crushed portion 45 of the second embodiment is formed by crushing in a direction of an arrow B (corresponding to a downward direction perpendicular to the ground surface and also a direction opposed to a fixing direction facing upward) in the figure in consideration of attachability of the clamp 43 and the like (see FIG. 2(c); the crushing direction is only an example). A crushed amount of the crushed portion 45 is set in consideration of a thickness of an annular pipe attaching portion 32 of the clamp 43 as described below. Also, to prevent rattling of the high-voltage wire 25, the crushed amount is set to leave a space as small as possible.

The high-voltage wire 25 is contacted with the pipe inner surface 47 in a state of being biased to the lower side in the figure by the crushed portion 45 and the protrusion 46.

The clamp 43 includes an annular pipe attaching portion 32 and an engaging portion 33 integrally formed with the annular pipe attaching portion 32 via a base portion 48. The base portion 48 has a size adapted not to protrude relative to the crushed portion 45. The engaging portion 33 is caught in an engaging hole of the panel member 33 to be engaged and fixed therein.

The wire harness 41 of the second embodiment 2 as described above with reference to FIGS. 2(a) to 2(c) achieves the same effects as those of the first embodiment.

In the foregoing, although the wire harness of the present invention has been described with referenced to the detailed and specific embodiment, the invention is not limited to each of the embodiments as described above, but numerous modifications can be made without departing the scope and spirit of the present invention.

The configurations of the wire harnesses 21 and 41 according the first and second embodiments are only examples. The wire harnesses may have the following configurations. That is, the wire harnesses may be constituted of two conducting paths, an electric shield member for simultaneously covering two conducting paths, and one pipe member for receiving the conducting paths covered with the electric shield member. Alternatively, the wire harness may be constituted of two non-shielded high-voltage wires, and two pipe members having an electric shield function and configured for respectively receiving each of two non-shielded high-voltage wires.

The present application is based on Japanese Patent Application No. 2010-186802 filed on Aug. 24, 2010, the contents of which are incorporated herein by reference.

INDUSTRIAL APPLICABILITY

According to the wire harness of the present invention, there can be provided wire harnesses which can improve workability, can be reduced in thickness to increase the distance spaced from the ground surface, can be prevented from rattling in pipes while inhibiting an increase of types of pipes, and enhance heat radiation effect.

REFERENCE NUMERALS LIST

1: Hybrid vehicle
2: Engine
3: Motor unit
4: Inverter unit
5: Battery
6: Engine room
7: Vehicle rear section
8: High-voltage wire harness
9: Junction block
21: Wire harness
22: Panel member (Fixed member)
23: Floor-beneath portion
24: L-shaped bracket (Fixed member)
25: High-voltage wire (conducting path)
26: Pipe member
27: Clamp
28: Pipe inner surface
29: Pipe outer surface
30: Crushed portion
31: Protrusion
32: Annular pipe attaching portion
33: Engaging portion
34: Supporting portion
35: Fixing portion of bracket
36: Engaging hole

The invention claimed is:

1. A wire harness, comprising:
a conducting path;
a pipe member which receives the conducting path; and
crushed portions provided at a plurality of points on the pipe member,
wherein the pipe member has a first cross-sectional shape along its length except at the plurality of points at which the crushed portions are formed,
the crushed portions being formed by crushing an outer surface of the pipe member inward, the crushed portions having a second cross-sectional shape that is different from the first cross-sectional shape and non-circular.

2. The wire harness according to claim 1, wherein
the crushed portions are provided in correspondence with fixing positions of the pipe member with respect to a fixed member to which the pipe member is fixed.

3. The wire harness according to claim 1, wherein
the crushed portions are formed by crushing in one direction or two directions including the one direction and an other direction aligned with a fixing direction of the pipe member.

4. The wire harness according to claim 1, wherein the second cross-sectional shape of crushed portions is a stadium shape.

5. The wire harness according to claim 1, wherein the pipe member comprises a resin.

6. The wire harness according to claim 1, further comprising:
   a clamp including an annular pipe attaching portion and an engaging portion integrally formed with the annular pipe attaching portion, the clamp being attached to at least one of the crushed portions.

7. The wire harness according to claim 6, wherein at least one of the crushed portions has a length along the pipe member sufficient to accommodate a position misalignment by slight sliding of the corresponding clamp for fixing to a fixed member.

8. The wire according to claim 6, wherein a width of the crushed portion in an axial direction of the pipe member is larger than a width of the corresponding clamp in the axial direction of the pipe member.

* * * * *